Figure 1:
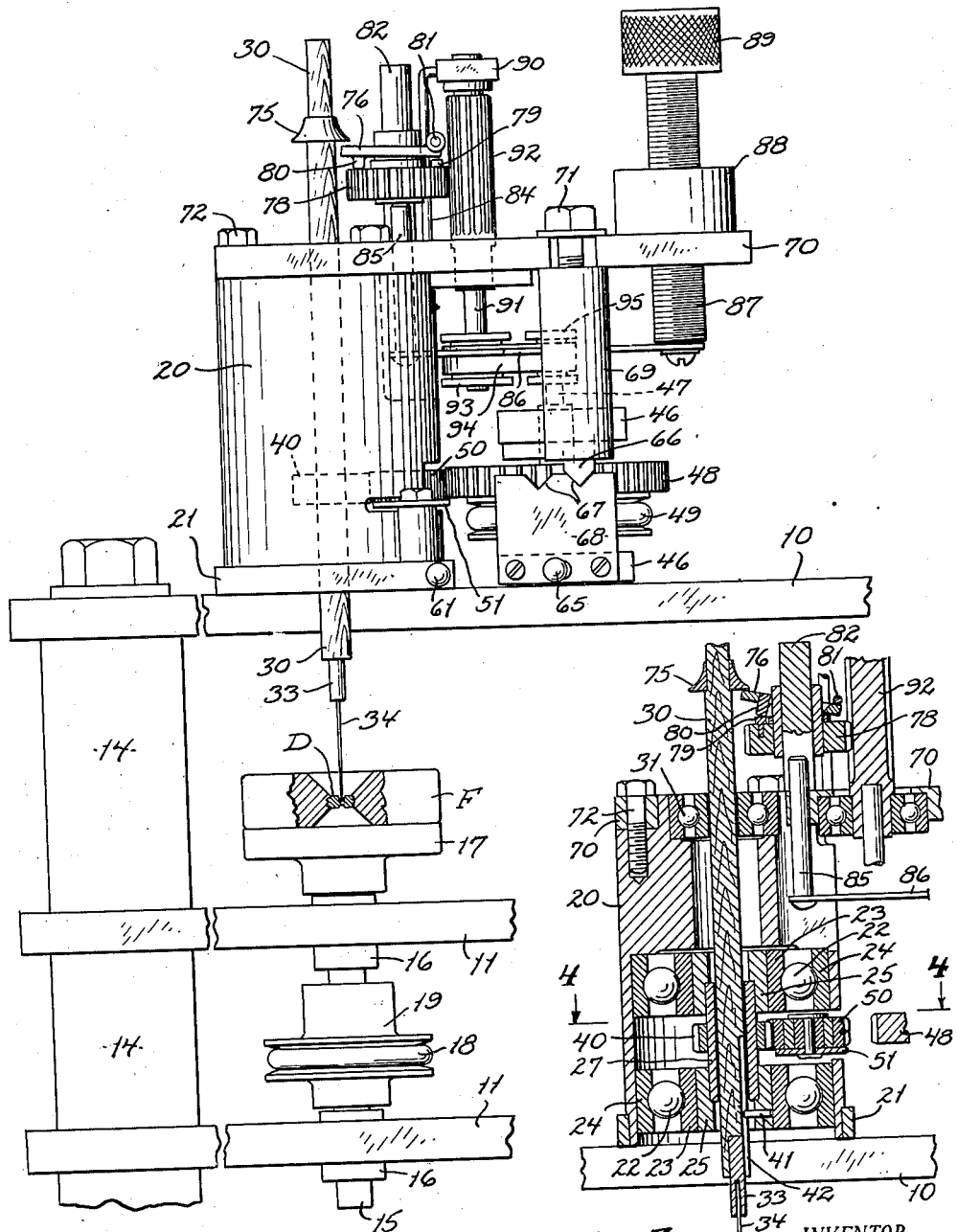

Nov. 6, 1945.  H. G. HANEMANN  2,388,610
DIAMOND DIE DRILLING MACHINE
Filed Jan. 1, 1943  2 Sheets-Sheet 2

INVENTOR.
HERMAN G. HANEMANN
BY
Bates, Teare, & M'Bean
ATTORNEYS

Patented Nov. 6, 1945

2,388,610

UNITED STATES PATENT OFFICE 2,388,610

DIAMOND DIE DRILLING MACHINE

Herman G. Hanemann, Radburn, N. J., assignor to The Lindsay Wire Weaving Company, Cleveland, Ohio, a corporation of Ohio Application January 1, 1943, Serial No. 471,071

7 Claims. (Cl. 125—30)

This invention relates to a mechanism for drilling relatively small holes in diamonds to form dies for use in processing wire. More particularly, the present invention relates to a machine for drilling holes of diameters from four ten-thousandths of an inch to five thousandths of an inch. These, therefore, are the general objects of the invention.

In the past it has been customary to drill diamonds with a mechanism having a horizontally extending drill and drill spindle. While more or less satisfactory results have been obtained by using horizontal type machines, they have been extremely slow and cumbersome. The operation of these machines has been expensive and because of the bench space required for their operation, an operator has been required for every four or five machines. This increases the cost of the product, and because of the scarcity of skilled operators, materially limits the production of dies.

An object of the present invention is to provide a diamond drilling machine for drilling fine holes in diamond or similar dies, which machine will be compact so that a single operator may control ten to twelve machines, thereby materially reducing the labor cost per die and increasing the output per operator. I attain compactness by using a vertical drill spindle and thereby enable the grouping of several machines relatively close together within easy observation and reach of a single operator.

Many serious problems were encountered as the result of attempting to drill very small holes on a vertical spindle machine which had not been found in horizontal type machines. It was found that the accuracy of the machine was impaired to such an extent that the advantages of compactness was offset by the inaccurate results. The dies were drilled oversize, and the life of the needle drills was materially less than in horizontal type machines. Indeed, when the hole desired was within the range of from ten-thousandths to fifteen ten-thousandths of an inch, an operator was fortunate in obtaining two accurate dies out of every five drilled. So far as I know, the smallest hole which could be drilled on a vertical machine was about two-thousandths of an inch in diameter.

I found that these inaccuracies were due to many causes. For instance, the mere weight of the spindle caused the needle point of the drill to be blunted or bent out of shape. The repeated raising and lowering of the needle during the drilling operation, to permit the drilling compound to enter the hole being drilled, accentuated this dulling of the needle. Further, the driving strains transmitted to the drill spindle by its driving mechanism and the reaction of the spindle driving gears or belts materially decreased the accuracy of the mechanism. Difficulty was also encountered in moving a newly ground needle into a partially drilled diamond while maintaining alignment. Even though the first part of the operation was carried out with a high degree of accuracy, the replacing of a dulled needle drill with a reground drill, which might become bent in this replacement, in many instances caused the loss of the work piece.

It is a more specific object of this invention to provide a diamond drilling mechanism to overcome the disadvantages above mentioned. I prefer to accomplish these objects by providing a lightweight drill spindle weighing preferably in the neighborhood of two grams or less and by mounting the drill spindle in such manner that despite its lightness in weight, the spindle will move downward in its bearings under the influence of gravity. I also arrange the spindle driving mechanism of the spindle, and the spindle bearings, so that the spindle may be driven with substantially no frictional wear either to the spindle or its bearings due to the spindle driving forces and reactions thereof. I further provide an efficient and improved arrangement for controlling the reciprocable motion of the spindle and for limiting its downward movement.

Other objects and advantages of my invention will become more apparent from the following description, reference being had to the accompanying drawings in which there is illustrated a preferred embodiment of the invention. The essential and novel features will be summarized in the claims.

Figure 2:
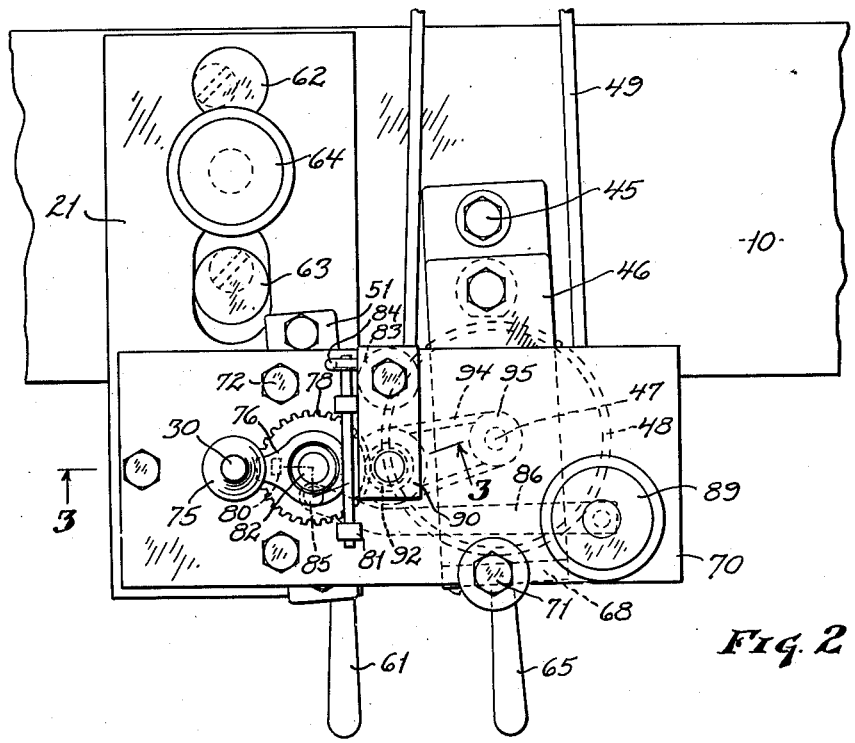
Figure 4:
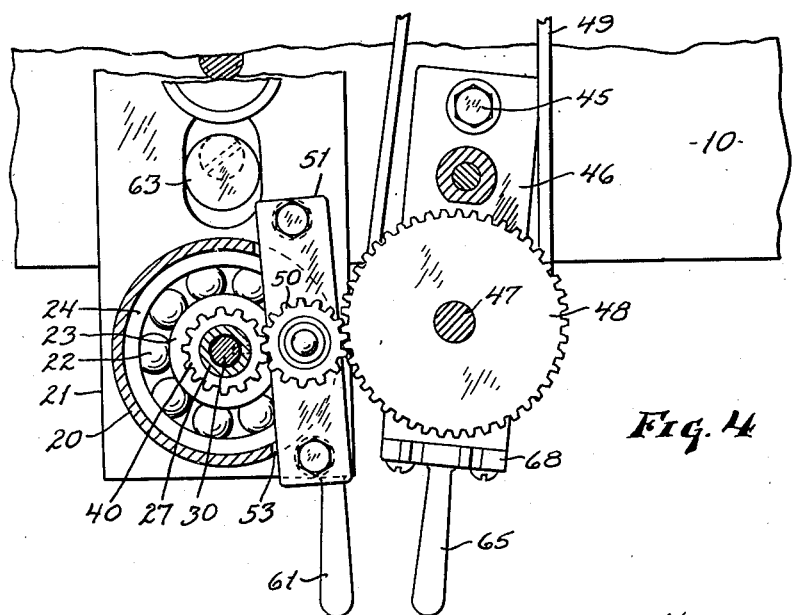

In the drawings, Fig. 1 is an elevation of my improved diamond drilling mechanism; Fig. 2 is a plan view of the mechanism; Fig. 3 is a fragmentary vertical section indicated by the offset lines 3—3 in Fig. 2, and Fig. 4 is a horizontal section as indicated by the lines 4—4 on Fig. 3.

My improved diamond drilling mechanism is mounted on a frame having a top frame plate 10 and a pair of horizontal bearing plates 11 suitably spaced from each other and held together by vertical frame and spacer members 14. Mounted on this frame is a plurality of duplicated drilling units, one unit of which is illustrated in the drawings. For each drilling unit I provide a rotatable work supporting table. The work table is best illustrated in Fig. 1 and as there shown, the table is supported by a vertical shaft 15 journalled in suitable bearings indicated at 16 as being supported by the respective bearing plates 11. Mounted on the upper end of the shaft 15 is a work table or disc 17 having a smooth upper surface on which a work fixture F carrying the diamond to be drilled may be positioned by the operator.

The work table is rotated by any suitable source of power, through the medium of a driving belt 18 which coacts with a drive pulley 19 mounted on the shaft 15 intermediate the bearings 16. I find it convenient to so arrange this drive that the work table will rotate in the opposite direction to the drill, and at a slower speed.

The drilling mechanism itself is mounted on the upper frame plate 10 with the drill spindle and drill extending along a vertical axis, and comprises a cylindrical frame or housing 20 secured to a base plate 21 which rests on the frame plate 10 and is adjustably secured thereto as will be hereinafter described. Mounted on the lower end of the housing 20 are a pair of spaced, vertically aligned bearings 22. As illustrated, these bearings preferably comprise precision type ball bearings, each having an inner race 23 and an outer race 24, the latter races engaging the inner wall of the housing and being secured thereto in the customary manner. Rigidly secured to each inner race 23 is a tubular bushing 25 which are rigidly attached to a tube 27. This tube is restrained against vertical movement by suitable shoulders formed in the bushings 25 and together with the bushings forms a three part spindle bearing sleeve rotatable as a unit.

The spindle is shown at 30 as extending through its bearing sleeve with its axis in a vertical position. As heretofore mentioned the spindle weighs two grams or less. I prefer to form the spindle of a material which is lighter in weight than metal. Accordingly, I prefer to use wood or a lightweight plastic rod for this purpose. The spindle is of such diameter that it will move freely in an axial direction through its bearing sleeve under the influence of gravitation alone despite its lightness in weight.

A needle drill is mounted in the lower end of the spindle in a metallic insert or chuck 33. As shown, this chuck is of smaller diameter than the diameter of the spindle and is retained therein by frictional engagement with the walls of an axial opening formed in the spindle. A drill or needle is secured in this chuck in the usual manner.

As heretofore mentioned, the spindle 30 is driven in such a way that substantially no driving strains or reactions thereof are transmitted to the spindle, thereby eliminating any frictional drag of the spindle in its bearings or any misalignment of the spindle, due to the drive. To this end I secure to the exterior of the spindle bearing sleeve a drive pinion 40 which is driven at a considerably higher speed than the work piece by gearing hereinafter to be described. Thus, all driving strains are transmitted directly from the spindle bearing sleeve to the bearings 22. The spindle 30 is driven by the bearing sleeve. As shown in Fig. 3, a pin 41 is secured to the bushing 25 of the sleeve and drivingly engages a slot 42 formed in the lower end of the spindle. Clearance is provided between this pin and the spindle in the same manner as between the spindle and its bearing sleeve so that strains imposed on the sleeve will not be transmitted to the spindle itself.

The clearance between the spindle and its bearing sleeve is such as to permit the lightweight spindle to move downwardly toward the work D solely under the influence of gravity. I have found such clearance to be sufficient to permit the needle drill and spindle to accurately align itself with a partially drilled hole in a work piece, thus compensating for slight inaccuracies caused by regrinding the drill or the like. Similarly, this freedom of movement of the spindle permits the drill to realign itself with a countersunk cavity previously made in the work piece, thereby insuring accurate alignment during the initial drilling operation.

The drill spindle extends some distance above the housing 20 for operation of a drill reciprocating mechanism as well as to permit the entire spindle to be readily withdrawn from the work. Any tendency of the spindle to wobble in its bearing sleeve is prevented by a bearing 31 positioned at the top of the housing. Here, again, clearance is provided between the walls of the spindle and bearing to permit free gravitation of the spindle.

The spindle drive gear is so driven that it may be disconnected from the source of power at the will of the operator. For this purpose, I pivot to the upper frame plate 10, as at 45, a bracket 46. Journalled in this bracket is a vertical shaft 47 to which is secured a compound gear and pulley 48. The pulley is arranged to be driven by a drive belt 49 which is connected to the source of power in the usual manner. Normally, the gear 48 meshes with an idler pinion 50 journalled on a bracket 51 which extends through a slot 53 in the housing 20 and which is secured to the housing supporting plate 21.

The gear bracket 46 is provided with a handle 65 to facilitate shifting of the gear 48 to and from the idler pinion 50 to connect or disconnect the spindle drive as desired. An additional handle 61 may be rigidly fixed in the base plate 21 so that the operator may grasp the two with one hand and thereby exert the force necessary to move the bracket from one restrained positioned to the other, as later described, without undue overtravel. The positioning of the gear 48 relative to its idler pinion is insured by a spring pressed plunger 66 which engages either of two notches 67 in a plate 68 secured to the bracket 46. The plunger is of the usual type, being slidable vertically in a cylindrical casing 69 having the usual spring (not shown) enclosed therein. This plunger casing 69 is adjustably secured to a plate 70 by a bolt 71 passing through an enlarged opening in the plate which is mounted on the spindle housing 20 as by bolts 72.

As previously mentioned the drill spindle housing or mounting 20 is so arranged that it may be moved to align the drill 34 with the work D. To this end I slidably mount the housing supporting plate 21 on the frame member 10. The position of this mounting relative to the work table 17 is adjusted by a pair of eccentric cams 62 and 63 (Fig. 2). A clamping nut such as indicated at 64, is provided to secure the table in adjusted position.

The spindle, together with the drill carried thereby, is vertically reciprocated at stated intervals during the drilling operation to enable the drilling compound such as diamond dust to enter the partially drilled hole. The spindle is provided adjacent its upper end with a collar 75 which may be engaged and lifted by one end of a lever or support 76 loosely mounted intermediate its ends on the hub of a gear 78 and provided with a counterweight 81. This lever is provided with a protuberance 80 arranged to engage the upper surface of the gear 78. This gear is mounted for rotatable and axial movement on a supporting shaft 82 carried by the frame plate 70. The raising of the drill spindle is accomplished by a cam 79 on the gear 78 which engages the protuberance 80 and flips the lever or support 76 together with the spindle upwardly. During the period in which the cam 79 is free of the protuberance 80, the lever 76 rests in its lower position, spaced from the collar 75, and the needle is allowed to rest on the diamond D. Rotating of the lever 76 is prevented by engagement of the counterweight 81 with a post 83, supporting the upper bearing 90 of an elongated pinion later to be described, and with a rod 84 parallel to and spaced from the post.

The normal vertical position of the drill point is controlled by a micrometer adjustment. This adjustment is best seen in Figs. 1 and 3. As there shown, the gear 78 rests by gravity on a plunger 85 which is slidably mounted in the plate 70. This plunger is connected by an arm 86 with the lower end of a micrometer screw 87 which is threaded into a boss 88 in the plate 70, and which is provided with a knurled head 89 to facilitate its adjustment by the operator. The connection between the arm 86 and the screw 87 is such as will permit rotation of the screw.

The gear 78 is continuously driven to periodically cause the cam 79 to coact with the protuberance 80, thereby intermittently raising the drill about .005" to .010" from the diamond during the drilling operation. A vertically extending shaft 91 is journalled in the plate 70 and carries an elongated pinion 92 which meshes with the slidable gear 78. The lower end of this shaft is provided with a pulley 93, connected by an elastic band 94 to a driving pulley 95 carried by the drive shaft 47 heretofore mentioned. The elasticity of this band permits movement of the gear 48 out of contact with the spindle driving mechanism and serves normally to urge such mechanism into coacting relationship.

From the foregoing description, it will be seen that I have provided a mechanism for drilling holes of relatively small diameters in diamonds with a very high degree of precision, and have so arranged the mechanism that the product will not be affected by driving strains or torques, and at the same time have so arranged the mechanism that a group of drilling units may be placed relatively close together to the end that they may be controlled by a single operator. The mechanism is not only compact, thereby enabling several machines to be placed within the reach of one operator, but in addition has been found to perform its work with a higher degree of accuracy than any known types of machines used in the past.

I claim:

1. In a drilling mechanism for drilling comparatively small holes in work pieces, a frame, bearings in said frame, a drill spindle mounted in said bearings with its axis extending vertically, said spindle being freely slidable axially in its bearings, means to rotate said spindle, an axially movable gear mounted in said frame with its axis extending vertically, adjustable means to control the position of said gear along its axis, a collar secured to said spindle above said bearings, a lever rockably supported by said gear and extending to a position below and into engagement with said collar, cam means carried by said gear and adapted to coact intermittently with said lever to move said spindle upwardly intermittently, and means to rotate said spindle and said gears.

2. A machine for drilling comparatively small holes in work pieces comprising in combination, a frame, spaced bearings carried by the frame, a drill spindle mounted in said bearings with its axis extending vertically, said spindle being freely slidable axially in its bearings, a gear embracing one of said bearings and being rigidly fastened thereto, means for driving said gear, there being a splined connection between the bearings and the spindle whereby the spindle may be rotated but may be withdrawn vertically from the machine without disturbing the driving connection therefor, a second gear mounted on an axis parallel to that of the spindle, a peripheral shoulder on the spindle, a cam actuated by the last-named gear for exerting force on said shoulder to reciprocate the spindle during rotation thereof, means for driving the last-named gear, and micrometer means for shifting the last-named gear axially so as to limit the extent of the drop of the spindle during its reciprocating rotary operation.

3. A machine for drilling comparatively small holes in work pieces comprising in combination, a frame, a drill spindle journalled in the frame and freely movable therein in a direction extending axially of the spindle, an annular gear embracing the spindle for rotating it, said spindle being withdrawable from the machine without disturbing the position of the driving gear, means for rotating the driving gear, said means being shiftable out of engagement with said gear for stopping rotation of the spindle, a lever for raising the spindle, a cam mechanism for intermittently operating the lever to lift the spindle during rotation thereof, a manually settable screw-threaded member and means operated thereby for variably limiting the position of the lever to limit the downward movement of the spindle.

4. In a drilling mechanism for drilling comparatively small openings in work pieces, a frame, a freely slidable spindle mounted in said frame and having its axis extending vertically, said spindle being of a material of a specific gravity less than any known metal and adapted to carry a drill resting by gravity on the work, bearings interposed between said spindle and said frame to rotatably position the spindle, there being sufficient clearance between said bearings and spindle to permit downward movement of the spindle under the influence of gravity alone, means adapted to engage the spindle to raise said spindle intermittently, and means to rotate said spindle continuously without interference with the vertical movement thereof, said spindle being withdrawable upwardly from said mechanism without disturbing the driving connection therefor or the raising means.

5. In a drilling mechanism for drilling comparatively small holes in work pieces, a frame, bearings in said frame, a drill spindle mounted in said bearings with its axis extending vertically, said spindle being freely slidable axially in its bearings, means to rotate said spindle, a collar on said spindle, a rockable lever extending below said collar and adapted to move upwardly against the collar, a cam rotatably mounted in said frame with its axis extending vertically and adapted to coact with said lever to intermittently move said spindle upward, and means for varying the axial position of the cam along its axis to limit the axial movement of the spindle in a downward direction during the rotation thereof.

6. In a drilling mechanism for drilling comparatively small holes in work pieces, a frame, bearings in said frame, a drill spindle mounted in said bearings with its axis extending vertically, said spindle being freely slidable axially in its bearings, means to rotate said spindle, a collar on said spindle, a rockable lever extending into engagement with the under surface of said collar, a vertically movable rotatable cam carried by said frame on an axis parallel to the spindle, said cam being arranged and adapted to cause said lever to act on said collar to intermittently raise said spindle consequent upon rotation of said cam, and means to vary the vertical position of said cam to thereby control the range of reciprocation of said spindle, and said spindle being withdrawable upwardly from the machine without disturbing any of the driving connections therefor.

7. In a drilling machine, the combination of a frame, bearings in said frame, a drill spindle mounted in said bearings with its axis extended vertically and slidable through the bearings so that the drill may rest by gravity on the work, mechanism to rotate the spindle, a collar on the spindle, a rotatable member carrying a cam, a lever operable by said cam to engage the collar and lift the spindle from the work, and settable means for varying the vertical position of the lever without disturbing its operating connection with the cam.

HERMAN G. HANEMANN.